(12) United States Patent
Lee et al.

(10) Patent No.: US 8,102,768 B2
(45) Date of Patent: Jan. 24, 2012

(54) METHOD AND SYSTEM FOR TRAFFIC FLOW CONTROL IN A COMMUNICATION NETWORK

(75) Inventors: Junghoon Lee, North Potomac, MD (US); George F. Elmasry, Farmingdale, NJ (US)

(73) Assignee: D & S COnsultants, Inc., Eatontown, NJ (US)

( * ) Notice: Subject to any disclaimer, the term of this patent is extended or adjusted under 35 U.S.C. 154(b) by 844 days.

(21) Appl. No.: 11/670,623

(22) Filed: Feb. 2, 2007

(65) Prior Publication Data
US 2008/0095066 A1    Apr. 24, 2008

Related U.S. Application Data

(60) Provisional application No. 60/852,596, filed on Oct. 18, 2006.

(51) Int. Cl.
*H04J 1/16* (2006.01)
(52) U.S. Cl. ...................................................... 370/235
(58) Field of Classification Search .................. 370/235, 370/395.2, 252, 395.4
See application file for complete search history.

(56) References Cited

U.S. PATENT DOCUMENTS

| | | | |
|---|---|---|---|
| 6,273,622 B1 | 8/2001 | Ben-David | |
| 6,643,258 B1 | 11/2003 | Ise et al. | |
| 6,757,248 B1 | 6/2004 | Li et al. | |
| 6,975,647 B2 | 12/2005 | Neale et al. | |
| 6,997,378 B2 | 2/2006 | Phillips et al. | |
| 7,069,438 B2 | 6/2006 | Balabine et al. | |
| 7,213,077 B2 | 5/2007 | Border | |
| 2005/0030952 A1* | 2/2005 | Elmasry et al. | 370/395.2 |
| 2005/0063307 A1* | 3/2005 | Samuels et al. | 370/235 |
| 2007/0115848 A1* | 5/2007 | Chean et al. | 370/252 |
| 2007/0297414 A1* | 12/2007 | Gupta et al. | 370/395.4 |

* cited by examiner

*Primary Examiner* — Derrick Ferris
*Assistant Examiner* — Gbemileke Onamuti
(74) *Attorney, Agent, or Firm* — Dennis M. Carleton; Fox Rothschild, LLP

(57) ABSTRACT

A method for controlling traffic flow in a communication network compliant with a Multilevel Precedence and Preemption (MLPP) scheme is described. The method selectively modifies parameters of TCP connections for transmissions to meet speed of service (SoS) requirements and establishes the connections in accordance with their levels of precedence. In applications, the method may be implemented in communication networks using High Assurance Internet Protocol Encryption (HAIPE) or an IP Security (IPSec) protocol.

24 Claims, 2 Drawing Sheets

METHOD AND SYSTEM FOR TRAFFIC FLOW CONTROL IN A COMMUNICATION NETWORK

CROSS-REFERENCE TO RELATED APPLICATIONS

This application claims benefit of U.S. provisional patent application Ser. No. 60/852,596, filed Oct. 18, 2006, which is herein incorporated by reference.

FIELD OF THE INVENTION

The present inventions generally relates to the field of communication networks and, in particular, to techniques for controlling traffic flow in a communication network.

BACKGROUND OF THE INVENTION

Communication networks may experience traffic congestion events. Traffic congestions are more likely to occur in networks using data encryption techniques and are detrimental to transmissions carrying time-sensitive information that, unless delivered within a specific time interval, may become outdated or invalid. In operation, to eliminate possibility of sending outdated information, such transmissions should be either delivered on time or terminated, i.e., not executed.

In military networks and some commercial networks, time limitations for delivery of time-sensitive transmissions are established, in accordance with an assigned level of precedence, i.e., priority, of the respective transmissions, based on a Multilevel Precedence and Preemption (MLPP) scheme. In particular, Speed of Service (SoS) requirements are given for each level of precedence. However, conventional techniques used for controlling traffic flow in Internet Protocol (IP) based communication networks cannot guarantee compliance with the SoS requirements based on the MLPP scheme.

Therefore, despite the considerable effort in the art devoted to controlling traffic flow in communication networks, further improvements would be desirable.

SUMMARY OF THE INVENTION

Embodiments of the present invention are generally directed to Internet Protocol (IP) based communications over military or commercial communication networks.

One aspect of the invention provides a method for controlling traffic flow in an IP based communication network. The method comprises steps of adjusting settings for Transmission Control Protocol (TCP) connections in accordance with levels of precedence and corresponding speed of service (SoS) requirements for the respective transmissions; authorizing TCP connections meeting the SoS requirements; establishing the TCP connections in accordance with SOS to their levels of precedence; and monitoring compliance of the TCP connections with the SoS requirements.

Another aspect of the present invention provides a method for controlling traffic flow of an IP based communication network comprising steps of adjusting settings of TCP connections based on (i) a level of precedence of a transmission encrypted using High Assurance Internet Protocol Encryption (HAIPE) or an IP Security (IPSec) protocol and (ii) requirements to the SoS of a Multilevel Precedence and Preemption (MLPP) scheme; establishing TCP connections for transmissions meeting the SoS requirements in accordance with their levels of precedence; aborting TCP connections for transmissions failing to meet the SoS requirements; and monitoring compliance of the TCP connections with the MLPP scheme.

Yet another aspect of the present invention is a communication network adapted for using at least one of these methods.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

BRIEF DESCRIPTION OF THE DRAWINGS

To facilitate understanding, identical reference numerals have been used, where possible, to designate identical elements that are common to the figures. The images in the drawings are simplified for illustrative purposes and are not depicted to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

The term "exemplary" is used herein to mean "serving as an example, instance, or illustration." Any embodiment or design described herein as "exemplary" is not necessarily to be construed as preferred or advantageous over other embodiments or designs.

Figure 1:
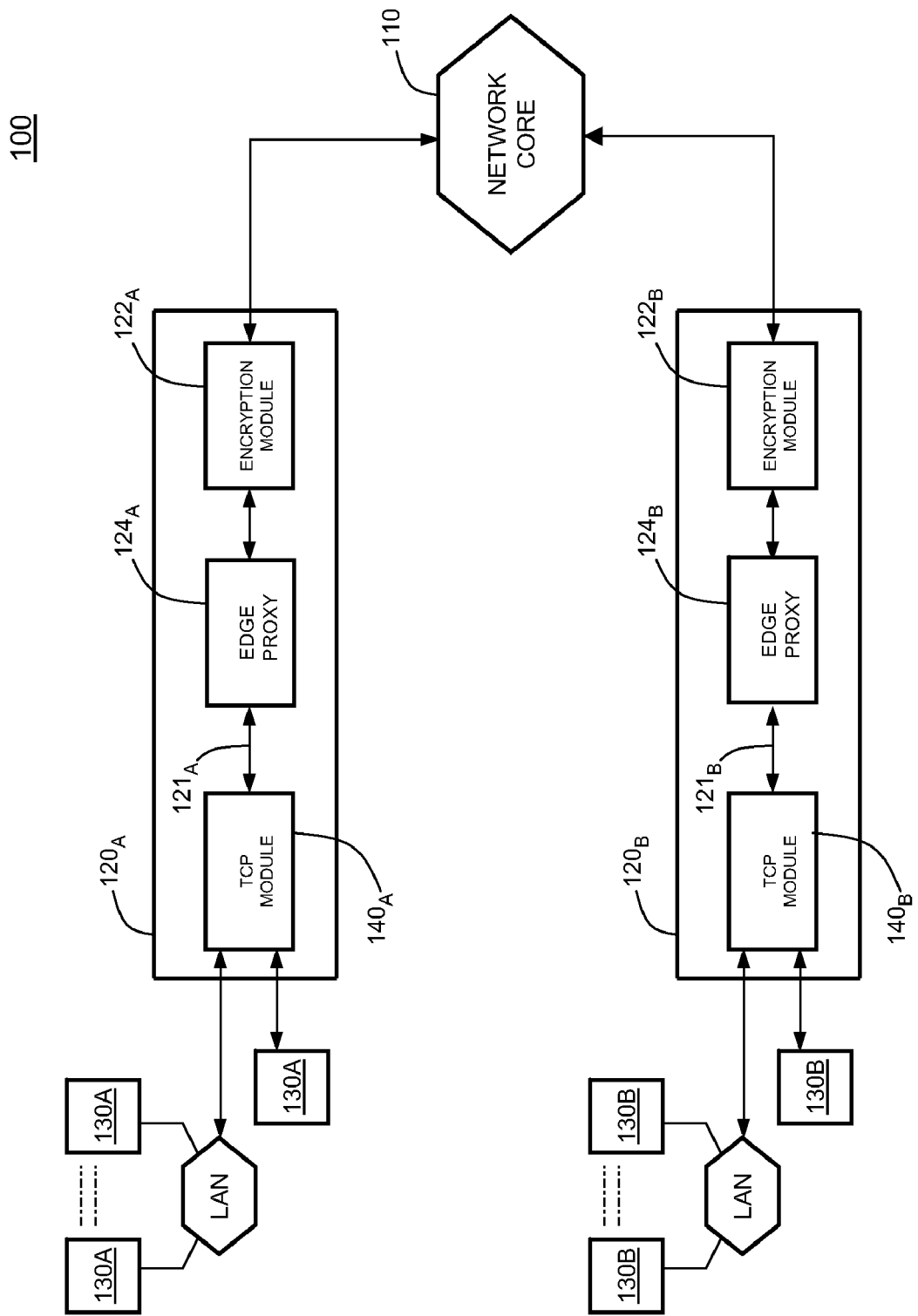
FIG. 1 is a high-level, schematic diagram of an exemplary communication network adapted for using the present invention.

Referring to the figures, FIG. 1 depicts a high-level, schematic diagram of an exemplary communication network. In exemplary embodiments, the network 100 is an Internet Protocol (IP) based wireless, wired, or fiber-optic communication network compliant with a Multilevel Precedence and Preemption (MLPP) scheme. Additionally, or alternatively, the network 100 is compliant with at least one data encryption protocol, for example, High Assurance Internet Protocol Encryption (HAIPE) or an IP Security (IPSec) protocol.

Illustratively, the network 100 comprises a network core 110 and a plurality of network edges 120 (network edges 120A and 120B are shown). In the depicted embodiment, each network edge 120 generally includes an optional encryption module 122, an edge proxy 124 coupled to respective client devices 130, and a TCP module 140 coupled to the edge proxy 124. The client devices 130 may be connected to the TCP module 140 directly or via a local area network (LAN).

The TCP module 140 may be realized as a software module, a hardware device, or a combination thereof. In some embodiments, the TCP module 140 is a portion of the edge proxy 124. In the network 100, traffic flow from the client devices 130 to the TCP module 140 is controlled at the edge proxy 124, as discussed below in reference to FIG. 2.

In operation, via the TCP modules 140, the edge proxies 124 exchange transmissions between each other. The transmissions contain messages addressed by particular operators of the client devices 130 of one edge proxy, e.g., edge proxy 120A, to one(s) of another edge proxy, e.g., edge proxy 120B. Herein, the term "transmissions" refers to messages comprising one or more units of packetized data, i.e., transmission units, addressed to the same interim destination, such as the edge proxy 124, and terms "transmitting" and "sending" are used interchangeably.

At a TCP module of a transmitting edge proxy (for example, TCP module 140A of the edge proxy 124A), data streams received from the client devices 130A are terminated and reconstructed in transmission units, or segments, for delivery to a TCP module at a common interim destination (for example, TCP module 140B of the edge proxy 124B) and forwarding to the addressed client device(s).

The transmitted units are numbered to identify their order and quantity. After the received units are checked for transmission-induced errors, the receiving edge proxy sends back to the transmitting edge proxy an acknowledgment confirming which units were received in a good order. In response to the acknowledgment, the transmitting edge proxy re-transmits the missing or corrupted units. In the network 100, transmissions and re-transmissions are executed in compliance with requirements of the MLPP scheme.

Figure 2:
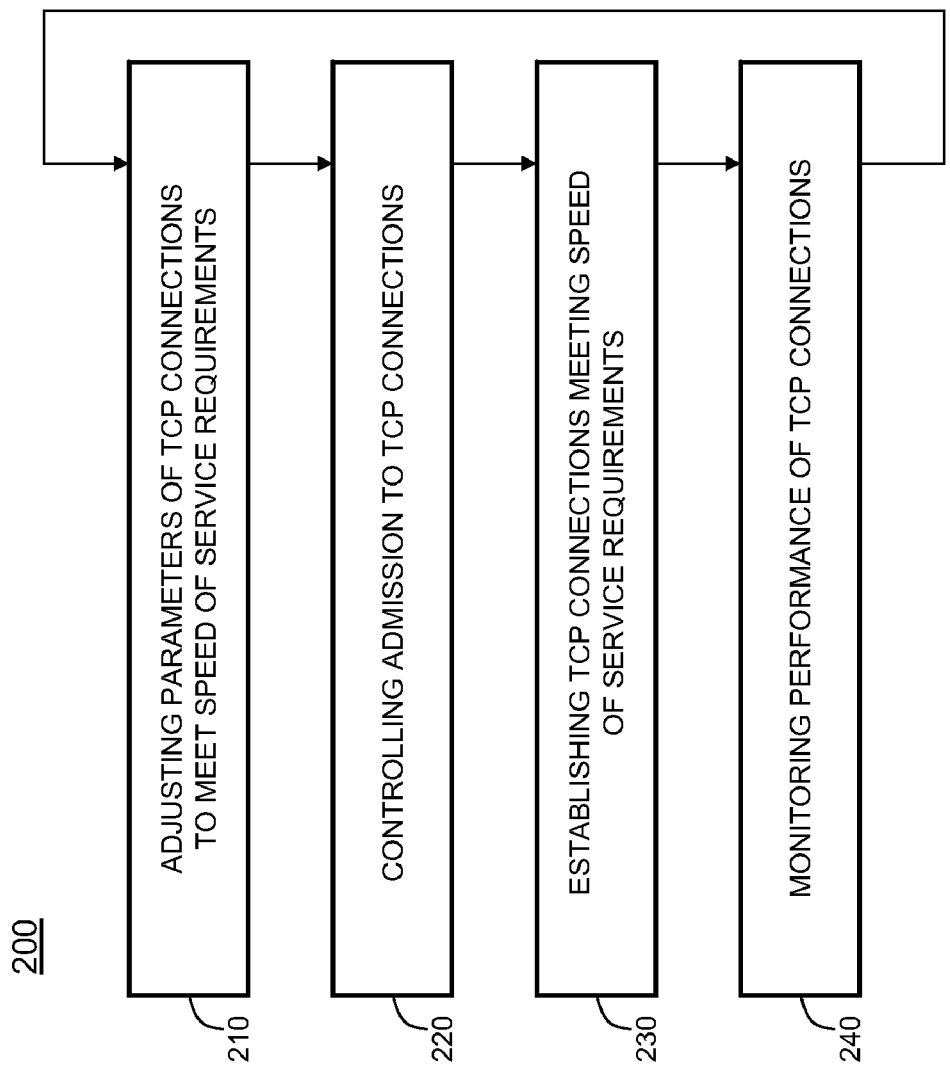
FIG. 2 is a flow diagram illustrating a method for controlling traffic flow in a communication network in accordance with one embodiment of the present invention.

FIG. 2 depicts a flow diagram illustrating a method 200 for controlling traffic flow in a communication network in accordance with one embodiment of the present invention. Method steps of the method 200 are executed at transmitting terminals of communication networks and illustratively discussed herein in reference to the network 100, where these steps may be performed at the edge proxies 124 of the network edges 120. To best understand the invention, the reader should refer to FIGS. 1-2 simultaneously.

In various embodiments, the method steps are performed in the depicted order; however at least two of these steps or portions thereof may be performed contemporaneously, in parallel, or in a different order. For example, at least portions of steps 210 and 220 or steps 230 and 240 may be performed contemporaneously or in parallel. Those skilled in the art will readily appreciate that the order of executing at least a portion of other discussed below processes or routines may also be modified.

Hereafter, aspects of the present invention are described within the context of IP-based communication networks and, in particular, communication networks where information (for example, voice, video, or alphanumerical data) is transmitted in an encrypted format. These networks may comprise wireless, wired, or fiber-optic communication links. It has been contemplated and is within the scope of the present invention that the method 200 may also be utilized within the context of other types of communication networks that are adapted for exchanging digitized information.

At step 210, parameters of a transmitting terminal (for example, edge proxy 124) are adjusted. In one embodiment, settings for at least one of a congestion window of the edge proxy, a re-transmission time-out, or a time delay for sending an acknowledgment for a received transmission are adjusted. More specifically, these settings are selectively adjusted for transmissions having different levels of precedence, for example, Routine, Priority, Immediate, Flash, or Flash Override levels of precedence of the MLPP scheme. Herein, the terms "congestion window" and "re-transmission time-out" refer to a number of outstanding transmission units and a time interval for re-transmitting missing or corrupted transmission units, respectively.

An adjusted setting $CWND_{adj}$ for the congestion window is determined using an equation:

$$CWND_{adj} = \max\{CWND_{current}, CWND_{required}\}, \quad \text{(Eq. 1)}$$

where $CWND_{current}$ is a current setting for the congestion window and $CWND_{required}$ is a setting for the congestion window that, at a transmitting edge proxy, allows to meet a speed of service (SoS) requirement of the MPPL scheme. In particular, $$CWND_{required} = (RTT_e \times MSS)/L_q, \quad \text{(Eq. 2)}$$

where $RTT_e$ is an estimated transmission round trip time, MSS is a maximum size, in bytes, of a transmission unit, and $L_q$ is a maximum value of transmission latency that allows to meet the SoS requirement of the MLPP scheme.

An adjusted setting $RTO_{adj}$ for the re-transmission time-out is determined using an equation:

$$RTO_{adj} = \min\{(N \times RTT_e), RTO_{max}\}, \quad \text{(Eq. 3)}$$

where N is a pre-determined constant in a range from 1 to 3 (typically, N=2), $RTT_e$ is an estimated transmission round trip time between transmitting and receiving edge proxies, and $RTO_{max}$ is a maximum re-transmission time-out interval that allows to meet the SoS requirement.

In one embodiment, the $RTO_{max}$ may be determined using an equation:

$$\sum_{i=1}^{I} p_e^{i-1}(1-p_e)^i \cdot [D_e + \alpha J_e + (i-1)RTO_{max}] = L_q, \quad \text{(Eq. 4)}$$

where $p_e$ is an estimated transmission loss ratio in the path between the transmitting and receiving edge proxies, $D_c$ is an estimated transmission transfer delay, $J_c$ is an estimated jitter delay, $\alpha$ is a pre-determined constant, I is a number of re-transmissions, and i is an integer, $1 \leq i \leq I$.

When the transmitting edge proxy uses Reed-Solomon error correction coding, the $RTO_{max}$ may be determined using an equation:

$$RTO_{max} = (L_q - D_q - \alpha J_e)/(I+1). \quad \text{(Eq. 5)}$$

An adjusted setting $DL_{adj}$ for the time delay for sending an acknowledgment for a received transmission is determined as summarized in Table 1, where $T_m$ is a pre-determined time interval:

TABLE 1

| TRAFFIC CONDITIONS | TIMING FOR SENDING ACKNOWLEDGEMENT |
|---|---|
| $RTT_e \leq T_m$ | Sending acknowledgement with time delay $DL_{adj} = 0$. |
| $RTT_e > T_m$ | Sending acknowledgement with time delay $DL_{adj} = RTT_e - T_m$. |

In operation, such settings $DL_{adj}$ for the time delay allow, at the transmitting edge proxy, to accelerate the outgoing traffic and meet the SoS requirements for the respective transmissions.

At step 220, the method 200 authorizes TCP connections for transmissions that meet both of the following conditions:

$$RTO_{max} > \beta RTT_e, \text{ and} \quad \text{(Eq. 6)}$$

$$RWND > CWND_{required}, \quad \text{(Eq. 7)}$$

where $\beta$ is a pre-determined constant, RWND is a maximum size of a congestion window at a destination point of the transmission (i.e., receiving edge proxy), and $RTO_{max}$ is determined using the equations Eq. 5 or Eq. 6, as discussed above in reference to step 210.

The condition of Eq. 6 allows to identify and terminate re-transmissions that acknowledgements arrived after expiration of the respective re-transmission time-out intervals. Correspondingly, the condition of Eq. 7 allows to identify and terminate transmissions that, due to an insufficient value of a congestion window at the destination point, cannot meet the SoS requirements. Transmissions meeting both of these conditions also meet the SoS requirements.

At step 230, the TCP connections are established for the transmissions meeting the SoS requirements, as determined at step 220. However, in operation, traffic congestions may cause transmission-violating incidents, such as unexpected excessive delays or packet losses. To increase probability of meeting the SoS requirements for transmissions having advanced levels of precedence, the method 200 dynamically controls the TCP connections as follows, wherein LP1<LP2<LP3:

TABLE 1

| TRAFFIC CONDITIONS | TCP CONNECTION STATUS |
| --- | --- |
| No violating incidents | Establish TCP connections meeting requirements to the SoS. |
| Occurrence of 1$^{st}$ violating incident during current communication session | Abort TCP connections having a level of precedence LP = LP1 for a pre-determined time interval T1 or a pre-determined number M1 of the transmissions. |
| Violation incident occurs during the time interval T1 or M1 transmissions | Abort TCP connections having a level of precedence LP $\leq$ LP2 for a pre-determined time interval T2 or a pre-determined number M2 of the transmissions. |
| Violation incident occurs during the time interval T2 or M2 transmissions | Abort TCP connections having a level of precedence LP $\leq$ LP3 for a pre-determined time interval T3 or a pre-determined number M3 of the transmissions. After the time interval T2 or M2 transmissions, abort the TCP connections having a level of precedence LP = LP1. |
| Violation incident occurs during the time interval T3 or M3 transmissions | Abort TCP connections having a level of precedence LP $\leq$ LP2 for a pre-determined time interval T4 or a pre-determined number M4 of the transmissions. |

At step 240, the method 200 monitors, in a real time, compliance of the TCP connections with the SoS requirements.

In further embodiments, in operation, at least a portion of steps 210, 220, 230, and 240 is cyclically repeated to accommodate changes in traffic conditions in the transmission path (s) between the transmitting and receiving edge proxies.

In exemplary embodiments, the method 200 may be implemented in hardware, software, firmware, or any combination thereof in a form of a computer program product stored on a computer readable medium and comprising one or more computer-executable instructions.

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A method for controlling traffic flow in an Internet Protocol (IP) based communication network, comprising software running on a computer acting as a network edge proxy in said network, said method comprising the steps of:
   (a) associating a speed of service (SoS) with a level of precedence;
   (b) selectively adjusting settings of Transmission Control Protocol (TCP) connections to meet the speed of service requirements for a particular level of precedence, said settings consisting of at least one of:
      (b1) adjusting settings $CWND_{adj}$ for a congestion window;
      (b2) adjusting $RTO_{adj}$ for a re-transmission time-out time interval using the equation:

$RTO_{adj} = \min\{(N \times RTT_e), RTO_{max}\}$, where N is a pre-determined constant in a range from 1 to 3, $RTT_e$ is an estimated transmission round trip time, and $RTO_{max}$ is a maximum re-transmission time-out interval determined using the equation:

$$\sum_{i=1}^{I} P_e^{i-1}(1-p_e)^i \cdot [D_e + \alpha j_e + (i-1)RTO_{max}] = L_q,$$

where $p_e$ is an estimated transmission loss ratio, $D_e$ is an estimated transmission transfer delay, $j_e$ is an estimated jitter delay $\alpha$ is a pre-determined constant, I is a number of re-transmissions, i is an integer, $1 \leq i \leq I$ and $L_q$ is a transmission latency requirement; and
      (b3) adjusting settings $DL_{adj}$ for time delays for sending acknowledgements of the transmissions;
   (c) authorizing use of the TCP connections for transmissions having levels of precedence requiring the available SoS;
   (d) establishing the TCP connections;
   (e) monitoring compliance of the TCP connections with the SoS requirements of the transmission;
   (f) dynamically controlling the TCP connections based on compliance with the required SoS; and
   (g) repeating steps (b) through (g) until the transmission is complete.

2. The method of claim 1, wherein the network is a wireless, wired, or fiber-optic communication network compliant with a Multilevel Precedence and Preemption (MLPP) scheme.

3. The method of claim 1, wherein the network is compliant with at least one data encryption protocol.

4. The method of claim 3, wherein the network uses High Assurance Internet Protocol Encryption (HAIPE) or an IP Security (IPSec) protocol.

5. The method of claim 1, wherein the TCP connection is a connection between a transmitting edge proxy and a receiving edge proxy of a tactical network having an encrypted core.

6. The method of claim 5, wherein steps (a)-(g) are performed at the transmitting network edge proxy.

7. The method of claim 1, wherein step (b1) comprises: determining the settings $CWND_{adj}$ using an equation:

$CWND_{adj} = \max\{CWND_{current}, CWND_{required}\}$, where $CWND_{current}$ is a current setting for the congestion window, $CWND_{required} = (RTT_e \times MSS)/L_q$, $RTT_e$ is an estimated transmission round trip time, MSS is a maximum size of a transmission unit, and $L_q$ is a transmission latency requirement.

8. The method of claim 1, wherein $RTO_{max}$ is determined using an equation:

$RTO_{max} = (L_q - D_e - \alpha j_e)/(I+1)$, where $L_q$ is a transmission latency requirement, $D_e$ is a transmission transfer delay, $\alpha$ is a pre-determined constant, $j_e$ is a jitter delay, and I is a number re-transmissions.

9. The method of claim 1, wherein step (b3) comprises: adjusting the settings $DL_{adj}$ as follows, where $RTT_e$ is an estimated transmission round trip time and $T_m$ is a pre-determined time interval:

| TRAFFIC CONDITIONS | TIMING FOR SENDING ACKNOWLEDGEMENT |
|---|---|
| $RTT_e \leq T_m$ | Sending acknowledgement with time delay $DL_{adj} = 0$. |
| $RTT_e > T_m$ | Sending acknowledgement with time delay $DL_{adj} = RTT_e - T_m$. |

10. The method of claim 1, wherein step (c) comprises: authorizing the TCP connections meeting both of the following conditions:

$RTO_{max} > \beta RTT_e$, and $RWND > CWND_{required}$, where $RTO_{max}$ is a maximum re-transmission time-out interval; β is a pre-determined constant, $RTT_e$ is an estimated transmission round trip time, RWND is a maximum size of a congestion window at a destination of the transmission, and $CWND_{required} = (RTT_e \times MSS)/L_q$, $RTT_e$ is an estimated transmission round trip time, MSS is a maximum size of a transmission unit, and $L_q$ is a transmission latency requirement.

11. The method of claim 10, wherein $RTO_{max}$ is determined using an equation:

$$\sum_{i=1}^{I} P_e^{i-1}(1-p_e)^i \cdot [D_e + \alpha j_e + (i-1)RTO_{max}] = L_q,$$

where $p_e$ is an estimated transmission loss ratio, $D_e$ is an estimated transmission transfer delay, $j_e$ is an estimated jitter delay, α is a pre-determined constant, I is a number of re-transmissions, i is an integer, $1 \leq I \leq I$, and $L_q$ is a transmission latency requirement.

12. The method of claim 10, therein $RTO_{max}$ is determined using an equation:

$RTO_{max} = (L_q - D_e - \alpha j_e)/(I+1)$, where $L_q$ is a transmission latency requirement, $D_e$ is a transmission transfer delay, α is a pre-determined constant, $j_e$ is a jitter delay, and I is a number re-transmissions.

13. The method of claim 1, wherein step (d) further comprises:
dynamically controlling the TCP connections as follows, wherein Level of Precedence 1 (LP1)<Level of Precedence 2 (LP2)<Level of Precedence 3 (LP3):

| TRAFFIC CONDITIONS | TCP CONNECTION STATUS |
|---|---|
| No violating incidents | Establish TCP connections meeting requirements to the SoS |
| Occurrence of 1st violating incident during current communication session | Abort TCP connections having a level of precedence LP = LP1 for a pre-determined time interval T1 or a pre-determined number M1 of the transmissions |
| Violation incident occurs during the time interval T1 or M1 transmissions | Abort TCP connections having a level of precedence LP ≦ LP2 for a pre-determined time interval T2 or a pre-determined number M2 of the transmissions |
| Violation incident occurs during the time interval T2 or M2 transmissions | Abort TCP connections having a level of precedence LP ≦ LP3 for a pre-determined time interval T3 or a pre-determined number M3 of the transmissions After the time interval T2 or M2 transmissions, abort the TCP connections having a level of precedence LP = LP1 |
| Violation incident occurs during the time interval T3 or M3 transmissions | Abort TCP connections having a level of precedence LP ≦ LP2 for a pre-determined time interval T4 or a pre-determined number M4 of the transmissions. |

14. The method of claim 1, wherein step (e) further comprises:
monitoring compliance of the TCP connections in real time.

15. A method for controlling traffic flow at a network edge proxy of an Internet Protocol (IP) based communication network, comprising software running on said network edge proxy executing instructions to perform the steps of:
(a) associating a speed of service (SoS) with a level of precedence in a Multilevel Precedence and Preemption (MLLP) scheme;
(b) selectively adjusting settings of Transmission Control Protocol (TCP) connections to provide the SoS requirements for a particular level of precedence, said setting consisting of at least one of
(b1) adjusting settings $CWND_{adj}$ for a congestion window;
(b2) adjusting settings $RTO_{adj}$ for a re-transmission time-out time interval using the equation:

$RTO_{adj} = \min\{N \times RTT_e, RTO_{max}\}$, where N is a pre-determined constant in a range from 1 to 3, $RTT_e$ is an estimated transmission round trip time, and $RTO_{max}$ is a maximum re-transmission time-out interval and
where $RTO_{max}$ is determined using the equation:

$$\sum_{i=1}^{I} P_e^{i-1}(1-p_e)^i \cdot [D_e + \alpha j_e + (i-1)RTO_{max}] = L_q,$$

where $p_e$ is an estimated transmission loss ratio, $D_e$ is an estimated transmission transfer delay, $j_e$ is an estimated jitter delay, α is a pre-determined constant, I is a number of re-transmissions, i is an integer, $1 \leq i \leq I$ and $L_q$ is a transmission latency requirement; and
(b3) adjusting settings $DL_{adj}$ for time delays for sending acknowledgements of the transmissions;
(c) establishing TCP connections for transmissions meeting the SoS requirements in accordance with levels of precedence of the transmissions, said transmissions being encrypted using High Assurance Internet Protocol Encryption (HAIPE) or an IP Security (IPSec) protocol;
(d) monitoring compliance of the established TCP connections with the MLPP scheme;
(e) temporarily aborting TCP transmissions failing to meet the SoS requirements; and
(f) repeating steps (b)-(f) until the transmission is complete.

16. The method of claim 15, wherein the network is a wireless, wired, or fiber-optic communication network.

17. The method of claim 15, wherein step (b1) comprises:
determining the settings $CWND_{adj}$ using an equation:

$$CWND_{adj}=\max\{CWND_{current}, CWND_{required}\},$$

where $CWND_{current}$ is a current setting for the congestion window, $CWND_{required}=RTT_e \times MSS/L_q$, $RTT_e$ is an estimated transmission round trip time, MSS is a maximum size of a transmission unit, and $L_q$ is a transmission latency requirement.

18. The method of claim 15, wherein $RTO_{max}$ is determined using an equation:

$$RTO_{max}=(L_q-D_e-\alpha j_e)/(I+1),$$

where $L_q$ is a transmission latency requirement, $D_e$ is a transmission transfer delay, $\alpha$ is a pre-determined constant, $j_e$ is a jitter delay, and I is a number re-transmissions.

19. The method of claim 15, wherein step (b3) comprises:
adjusting the settings $DL_{adj}$ as follows, where $RTT_e$ is an estimated transmission round trip time and $T_m$ is a pre-determined time interval:

| TRAFFIC CONDITIONS | TIMING FOR SENDING ACKNOWLEDGEMENT |
| --- | --- |
| $RTT_e \leq T_m$ | Sending acknowledgement with time delay $DL_{adj} = 0$ |
| $RTT_e > T_m$ | Sending acknowledgement with time delay $DL_{adj} = RTT_e - T_m$. |

20. The method of claim 15, wherein step (c) comprises:
establishing the TCP connections meeting both of the following conditions:

$$RTO_{max}>\beta RTT_e, \text{ and}$$

$$RWND>CWND_{required},$$

where $RTO_{max}$ is a maximum re-transmission time-out interval; $\beta$ is pre-determined constant, $RTT_e$ is an estimated transmission rout trip time, RWND is a maximum size of a congestion window at a destination of the transmission, and $CWND_{required}=(RTT_e \times MSS)/L_q$, $RTT_e$ is an estimated transmission round trip time, MSS is a maximum size of a transmission unit, and $L_q$ is a transmission latency requirement.

21. The method of claim 20, wherein $RTO_{max}$ is determined using an equation:

$$\sum_{i=1}^{I} P_e^{i-1}(1-P_e)^i \cdot [D_e + \alpha J_e + (i-1)RTO_{max}] = L_q,$$

where $P_e$ is an estimated transmission loss ratio, $D_e$ is an estimated transmission transfer delay, $J_e$ is an estimated jitter delay, $\alpha$ is a pre-determined constant, I is a number of re-transmissions, i is an integer, $1 \leq i \leq I$, and $L_q$ is a transmission latency requirement.

22. The method of claim 20, wherein $RTO_{max}$ is determined using an equation:

$$RTO_{max}=L_q-D_e-\alpha J_e)/(I+1),$$

where $L_q$ is a transmission latency requirement, $D_e$ is a transmission transfer delay, $\alpha$ is a pre-determined constant, $J_e$ is a jitter delay, and I is a number re-transmissions.

23. The method of claim 15, wherein step (e) further comprises:
dynamically controlling the TCP connections as follows, wherein Level of Precedence 1 (LP1)<Level of Precedence 2 (LP2)<Level of Precedence 3 (LP3):

| TRAFFIC CONDITIONS | TCP CONNECTION STATUS |
| --- | --- |
| No violating incidents | Establish TCP connections meeting requirements to the SoS |
| Occurrence of 1$^{st}$ violating incident during current communication session | Abort TCP connections having a level of precedence LP = LP1 for a pre-determined time interval T1 or a pre-determined number M1 of the transmissions |
| Violation incident occurs during the time interval T1 or M1 transmissions | Abort TCP connections having a level of precedence LP $\leq$ LP2 for a pre-determined time interval T2 or a pre-determined number M2 of the transmissions |
| Violation incident occurs during the time interval T2 or M2 transmissions | Abort TCP connections having a level of precedence LP $\leq$ LP3 for a pre-determined time interval T3 or a pre-determined number M3 of the transmissions After the time interval T2 or M2 transmissions, abort the TCP connections having a level of precedence LP = LP1 |
| Violation incident occurs during the time interval T3 or M3 transmissions | Abort TCP connections having a level of precedence LP $\leq$ LP2 for a pre-determined time interval T4 or a pre-determined number M4 of the transmissions. |

24. The method of claim 15, wherein step (d) further comprises:
monitoring compliance of the TCP connections in a real time.

* * * * *